Aug. 11, 1936.  A. PHILIPPE  2,050,804
BROOCH
Filed April 29, 1936
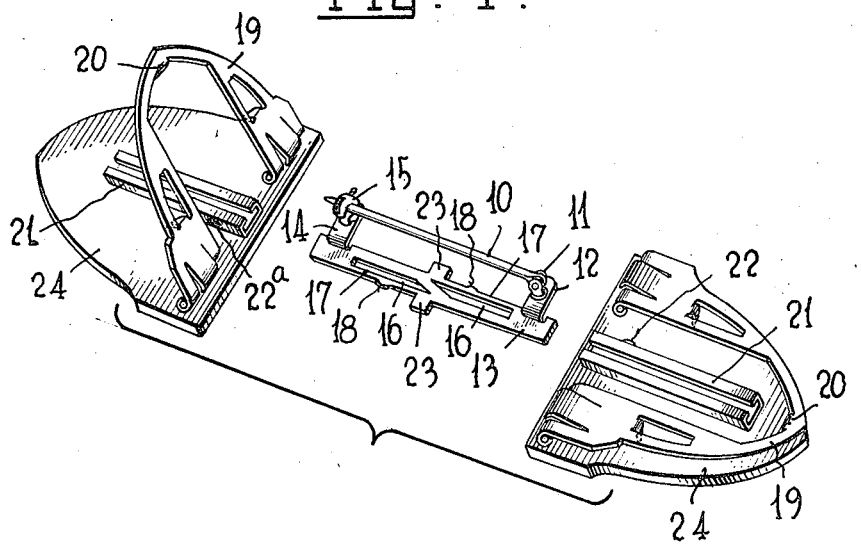
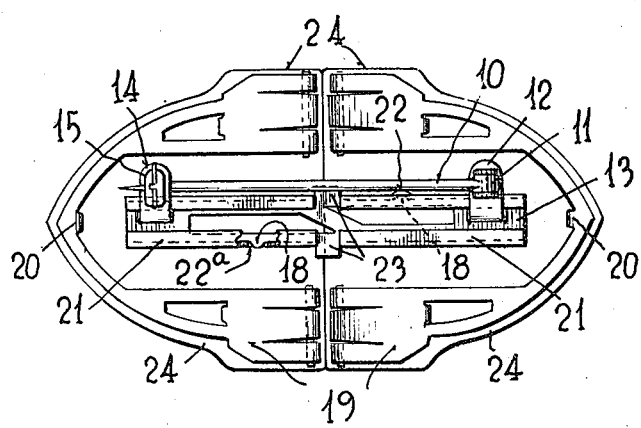
Inventor
Alfred Philippe,
By Karl Fruning
his Attorney Patented Aug. 11, 1936

2,050,804

UNITED STATES PATENT OFFICE 2,050,804

BROOCH

Alfred Philippe, New York, N. Y.

Application April 29, 1936, Serial No. 77,024

8 Claims. (Cl. 63—20)

The invention relates particularly to a pin or brooch the parts of which may be disassembled and separately used. While not specifically confined thereto the invention will be illustrated and described in connection with a pair of so-called lingerie clips, which are capable of separate independent use and which may be assembled into a brooch.

In the accompanying drawing Figure 1 is a perspective view of the disassembled elements. Fig. 2 is a back plan view of the elements assembled.

A pin 10 is hinged at 11 to a projection 12 at one end of a bar 13. On a projection 14 at the other end of the bar is a catch or keeper 15 for the free end of the pin. Intermediate these ends the bar 13 may be provided with a slot or slots 16 leaving a more or less thin edge 17 which because of its thinness may be resilient. Mounted on the resilient member is a projection 18 which is illustrated as more or less semi-circular or curvilinear in form.

This structure may be associated with any number of ornamental or the like devices of any sort. For illustrative purposes clips are shown which may be of any suitable form and may be ornamented in any desired way. This is well known and the ornamentation is not specifically illustrated, being ordinarily on the side of the clips not visible in the drawing.

The clips illustrated consist of base plates 24, provided with hinged back members 19. The back members 19 may be provided with the usual prongs or catches 20 to engage clothing when the clips are worn alone. On each base plate 24, and independent of the hinged back member 19, is a channel or slot 21 having side walls rising and turning inwardly so as to form more or less elongated longitudinal guide walls outlining a slot corresponding generally in shape and cross section substantially to the shape and cross section of the bar 13. The bar 13 may be passed into the slot 21 to mount the ornamental members on the pin carrying bar 13. As the bar 13 enters the slot 21 it may have a frictional engagement with the sides of the slot and in addition as the projection 18 enters the slot the resilient member 17 may give allowing the projection 18 to drag along the slot 21 until it is sufficiently seated in the slot. In order to properly position the bar in the slots there may be provided means to receive the projection 18. There may be provided in the sides of the slot 21 an outwardly pressed seat 22 or enclosed recess which preferably will substantially correspond to the shape of the projection 18, being semi-circular or curvilinear in form, or the seat may be merely an open recess 22a, extending through the wall of the slot to receive the projection 18. The outer ends of the slot 21 may be closed to limit the movement of the bar 13 therein or they may be open as illustrated and the inward movement of the bar 13 may be limited by the projection 18 or by the stop 23 which engages the inner ends of the slots 21. All of this positioning mechanism is not essential. It will be understood that because of the formation of the projection 18 and of its supporting member the bar may be withdrawn from the slot 21 by exerting pressure on the bar which will be sufficient to cause the projection 18 to slide away from and leave its seat 22 or 22a and come out of the slot. There is no means provided for locking the bar in the slot and no such means is needed, the friction between the members is sufficient to hold it normally in place. The long contact between the bar 13 and its slot seat tends to hold the members against twisting or displacement and in proper position for use without the necessity of other bracing, locking, supporting or positioning members or means.

It will be noted that the construction is extremely simple and consists of merely a bar on which the pin is mounted and which bar itself enters the slots and holds the ornamental members properly in place.

It will be noted that the attachment of the bar and pin to the clips in the form of the invention illustrated is entirely independent of the hinged back piece of the clip. As illustrated in Fig. 1 the bar may be inserted with the hinged back member either open or closed and no portion of the back member has any effect upon holding the bar in engagement with the ornamental members.

The invention may be embodied in numerous other forms.

I claim as my invention:

1. Two clips, longitudinal guide ways on the clips, a bar having sides corresponding in size and position to the guide ways, a resiliently mounted projection on the bar, a recess in one guide way to releasably receive the projection and position the bar in the guide ways, a pin mounted toward one end of the bar and a keeper for the pin toward the other end of the bar.

2. A bar, a pin hinged to one end of the bar, a keeper for the pin at the other end of the bar, a resiliently mounted projection on the bar, an independent member, longitudinal guide ways on the member adapted to slidably receive the bar, and a seat in the guide ways for releasably engaging the projection.

3. A bar, a pin carried by the bar, a projection on the bar, a pair of independent members, longitudinal guide ways on each member adapted to slidably receive the bar, and a seat in the guide ways on each member for resiliently releasably engaging the projection.

4. In a brooch assembly the combination of a supporting bar, a pin mounted on the bar, a pair of ornamental spring clips each having means defining a slot to receive an end of said bar, and means associated with each slot for resiliently releasably engaging the bar.

5. In a brooch assembly the combination of a supporting bar, a pin mounted on the bar, a pair of ornamental elements detachably mounted on the bar, each of the elements having means defining a slot at the back thereof to resiliently releasably receive an end of the bar.

6. In a brooch assembly the combination of a supporting bar, a pin mounted on the bar, a pair of ornamental elements, means on the elements defining a slot to receive the bar, a curvilinear projection resiliently mounted on the bar, a curvilinear socket in the slot adapted to engage the projection and release the projection on longitudinal movement of the bar.

7. In a brooch assembly, a pair of ornamental elements, a pin, a bar supporting the pin and having a portion cut away so as to make a side of the bar resilient, a curvilinear projection on the resilient side, slide ways on the elements approximately the size and shape of the bar so arranged that the bar may be forced into the slide ways so as to depress the projection, a curvilinear seat in the slide ways to receive the projection so that it may be released therefrom by sliding the bar.

8. Two clips, guideways on the clips, a bar having sides corresponding in size and position to the guideways, a resiliently mounted projection on the bar, and a recess in one guideway to releasably receive the projection and position the bar in the guideways.

ALFRED PHILIPPE.